United States Patent [19]

Phelps

[11] Patent Number: 4,592,877
[45] Date of Patent: Jun. 3, 1986

[54] COOLING TOWER WITH PARTIALLY FILLED AIR INLET PLENUM

[76] Inventor: Peter M. Phelps, 15 Buckeye Way, Kentfield, Calif. 94904

[21] Appl. No.: 764,350

[22] Filed: Aug. 12, 1985

[51] Int. Cl.$^4$ ................................................ B01F 3/04
[52] U.S. Cl. ..................................... 261/109; 261/111; 261/112; 261/DIG. 11
[58] Field of Search ............................. 261/109–112, 261/22, DIG. 11, DIG. 77

[56] References Cited

U.S. PATENT DOCUMENTS

| | | | |
|---|---|---|---|
| 2,394,755 | 2/1946 | De Flon | 261/DIG. 11 |
| 2,776,121 | 1/1957 | Fordyce | 261/111 X |
| 3,608,873 | 9/1971 | Furlong | 261/111 X |
| 3,643,931 | 2/1972 | Henning et al. | 261/112 X |
| 3,707,277 | 12/1972 | Phelps | 261/109 X |
| 3,917,764 | 11/1975 | Phelps | 261/111 |
| 3,983,190 | 9/1976 | Norback | 261/111 |
| 4,007,241 | 2/1977 | Phelps | 261/DIG. 11 |
| 4,317,785 | 3/1982 | Dickey, Jr. et al. | 261/111 |
| 4,385,011 | 5/1983 | Skold | 261/112 |

*Primary Examiner*—Richard L. Chiesa
*Attorney, Agent, or Firm*—Flehr, Hohbach, Test, Albritton & Herbert

[57] ABSTRACT

A cooling tower including counter flow film fill extending in a generally horizontal direction. Gravitating liquid is supplied to the film fill upper surface. Below the film fill is mounted splash fill disposed in the cooling tower inlet plenum. It includes an inner side sloping from an outboard portion of the film fill generally downward in an inboard direction and a conforming generally open central chamber. Air is optimally directed to the lower surface of the film fill means while simultaneously cooling the liquid on the splash fill means.

16 Claims, 3 Drawing Figures

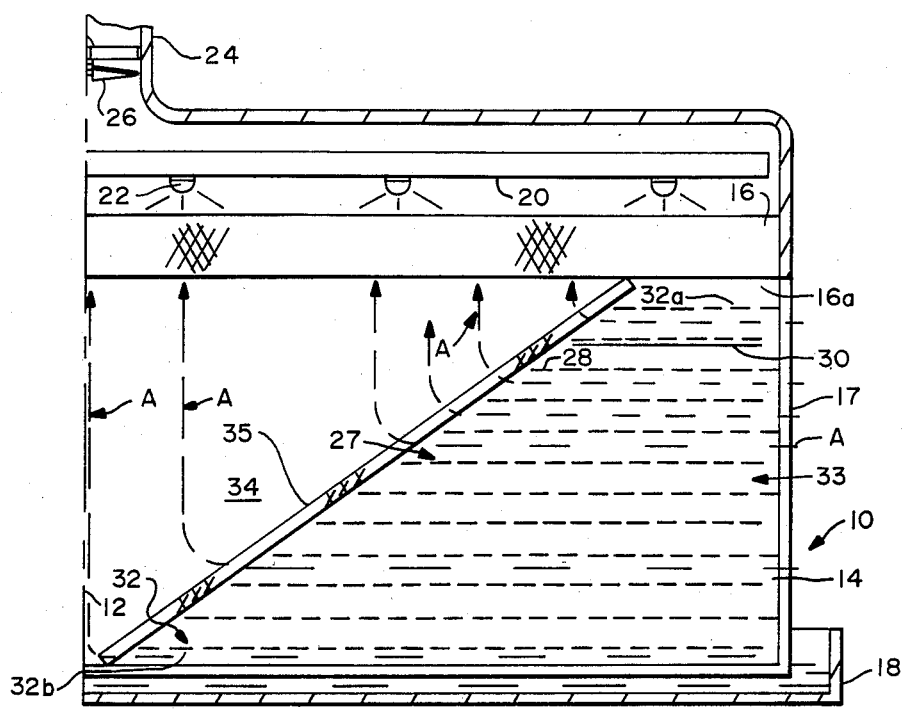
FIG.—1
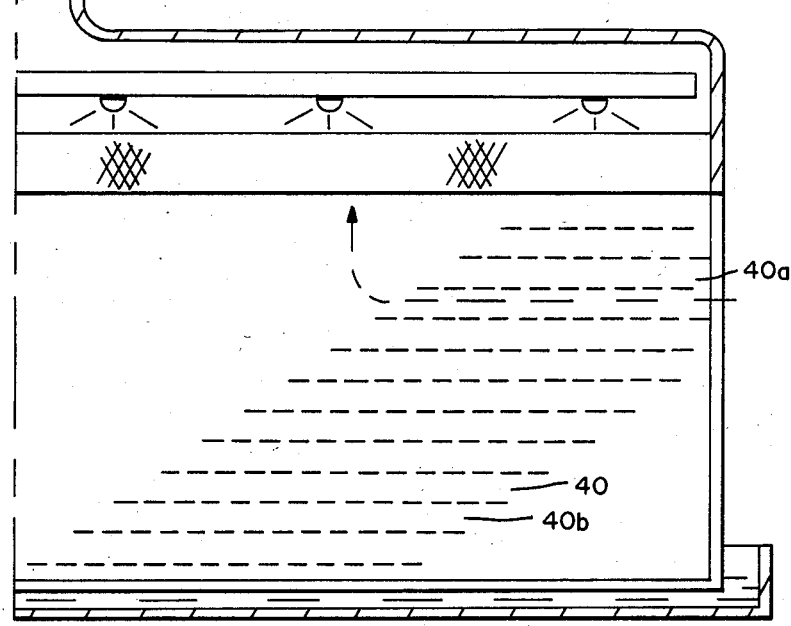
FIG.—2

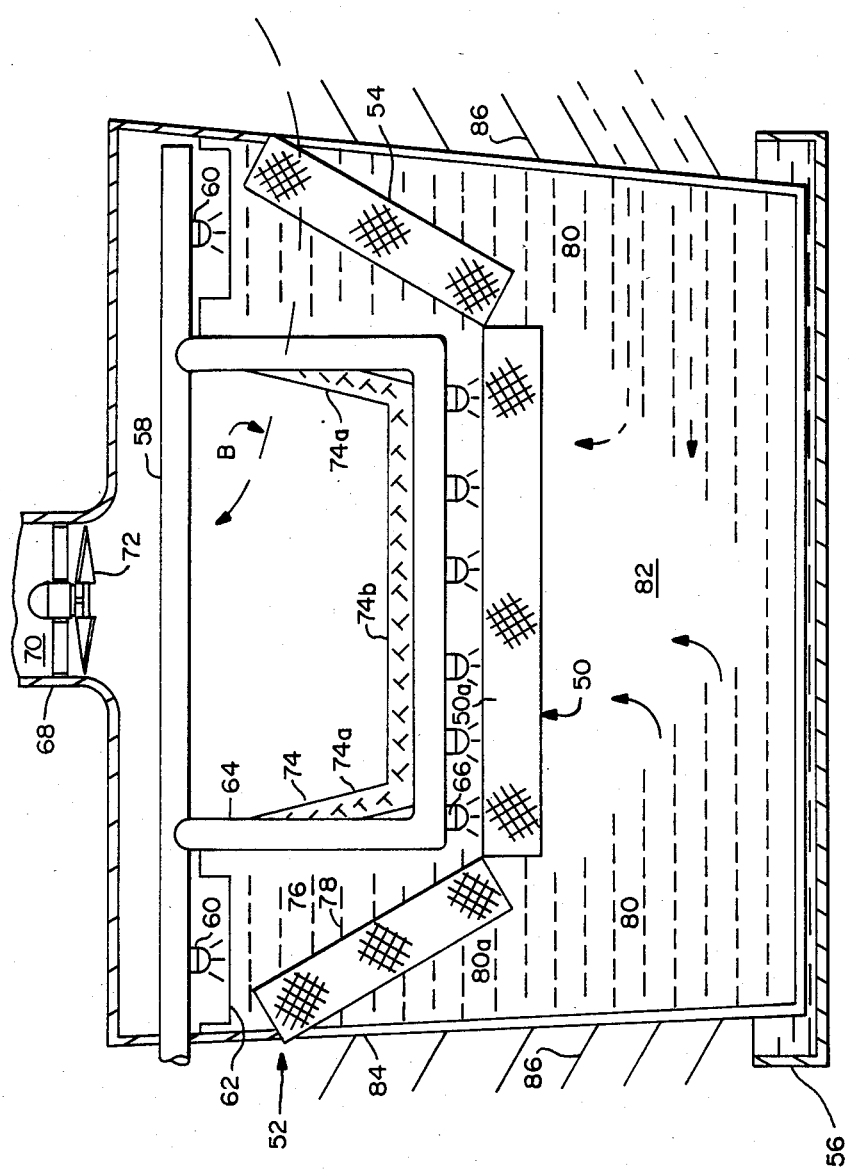
FIG.—3

COOLING TOWER WITH PARTIALLY FILLED AIR INLET PLENUM

BACKGROUND OF THE INVENTION

Horizontal counterflow film fill is recognized as an effective way to cool liquid, typically water, in a cooling tower. The water is sprayed onto the film fill which may be formed of spaced connected vertical sheets on which the water spreads out for more efficient cooling by upwardly flowing air. The air enters inlets in the lower portion of the tower flowing in a generally horizontal direction and is drawn upwardly into a vertical direction, typically by a fan mounted in a stack above the film fill or by the draft effect of a tall stack or chimney. The vertically flowing air cools the counterflowing gravitating water flowing through the film fill. One problem with this system is that there is an uneven distribution of the air due to the varying air resistance below the film fill in an inboard direction as the air turns upwardly. There is a natural tendency for the air to avoid the long route into the central portion of the tower. This leads to unequal cooling of the liquid in the film fill. Another source of inefficiency in this system is that there is little cooling which occurs below the film fill because the water tends to gravitate in concentrated streams leading to inefficient air liquid contact. One approach to improving the efficiency of air-water contact below the film fill is to dispose splash fill in the form of conventional spaced horizontal plates mounted on stringers below the film fill in the path of the inlet air. A system of this type is described in Henning, U.S. Pat. No. 3,643,931. Although this system does improve the air-water contact below the film fill, the spaced horizontal plates which extend across the entire area below the film fill create significant resistance to the air as it is drawn upwardly into the film fill. This resistance is increased when such splash fill substantially interferes with air travelling into the inboard or central region of the tower.

Phelps U.S. Pat. No. 3,917,764, suggests an excellent way to improve the efficiency of the distribution of air onto film fill by sloping the film fill so that the air entering the tower horizontally need not turn any extreme angles from the horizontal to the vertical. However, as disclosed, this system is not used in combination with a conventional tower utilizing horizontally disposed film fill.

Conventional splash fill horizontal air flow towers generally include a slight slope (e.g., 10° from the vertical) to counteract the effect of the drift inwardly of the gravitating water caused by the cross-flow of the air in a generally horizontal direction. See, e.g., column 3, lines 47-59 of Fordyce U.S. Pat. No. 2,776,121.

SUMMARY OF THE INVENTION AND OBJECTS

It is a general object of the invention to provide a cooling tower with generally horizontal film fill with an air inlet plenum partially filled with splash fill which both improves the uniformity of distribution of air to the lower surface of the film fill and also increases the air-liquid contact in the plenum.

It is a particular object of the invention to provide a system of the above type which includes splash fill with a sloping inner side terminating adjacent an open central chamber below the film fill.

Other objects and features of the invention will be apparent from the following description taken in conjunction with the appended drawings.

In accordance with the above objects, the present invention employs counterflow film fill extending in a generally horizontal direction. Water is distributed to the top surface of the film fill. Splash fill is disposed below the film fill to intersect the path between the gas inlet and outlet openings. The splash fill includes an inner side sloping from a region adjacent to an outboard portion of the film fill downwardly in an inboard direction. An open central chamber conforms to a slope of the inner side. the cooling tower may also include a second inner side facing the first one or may be in the form of an inverted cone or the frustum thereof. The tower may also include sloping film fill disposed outboard and above the substantially horizontal film fill.

BRIEF DESCRIPTION OF THE DRAWINGS

FIG. 1 is a schmematic representation of one side of a tower according to the invention in which the splash fill has a sloping inner side and a vertical outer side.

FIG. 2 is a schematic representation of the cooling tower of FIG. 1, wherein the outer wall of the splash fill includes a sloping portion.

FIG. 3 is a schematic representation of a cooling tower of the present invention which includes sloping film fill above and outboard of the horizontal film fill.

DETAILED DESCRIPTION OF THE EMBODIMENT

In general, the present invention relates to the partial filling with splash fill of the air inlet plenum below generally horizontal film fill in a cooling tower. Such cooling towers are commonly used for cooling a liquid, such as water, by inducing the surrounding gas, usually air, to contact and thereby cool the water. By use of splash fill of a particular configuration, the efficiency of such a cooling tower is substantially improved.

Referring to FIG. 1, the right hand side of a cooling tower, broadly denoted by the number 10, is illustrated extending to center line 12. The left hand side of the cooling tower is a mirror image of the right hand side and for simplicity of description, will not be described herein. The section includes an upright sidewall having air inlet opening 14. A film type fill assembly 16 to be described more fully hereinafter is mounted in the cooling tower as by brackets and the like having a principal plane which is generally horizontal, say within 5° of the horizontal. Fill assembly 16 has an upper surface in communication with the gravitating liquid from a source described below and incudes a lower surface in communication with a major portion of air entering air inlet opening 14 framed by tower sidewall 17.

A cooled liquid basin 18 is disposed below film fill assembly 16 in a position to receive gravitating liquid therefrom. Liquid is supplied to the top of film fill assembly 16 from water inlet pipe 20 which directs the water through spaced nozzles 22 which provide a uniform distribution of the liquid over the film fill assemblies. A vertical stack 24 is secured to the top face of tower 10 and extends upwardly to define an air outlet opening. A fan 26 is positioned within stack 24 and is adapted to be coupled to a suitable source of power for actuation. It causes currents of air to be drawn through film fill assembly 16 and out the tower. Alternatively, the cooling tower may be operated by natural induction by elimination of fan 26 in which case air would be induced to flow through the film fill assembly 16 by natural convection of warm exhaust air rising through an exhaust stack.

Referring to film fill assembly 16, it may be formed of corrugated film fill in which a number of corrugated sheets with ridges and grooves are disposed so that the ridges of alternative sheets cross and abut against the ridges disposed between alternative sheets to form channels therebetween. Typically, the channels have a constantly varying width from zero at the contact points between the sheets to a maximum of twice the distance between the ridges and grooves of individual sheets. Such sheets can be typically formed of plastic sheets such as polyvinyl chloride. Paper sheets may be impregnated with a suitable substance such as resin to impart the required mechanical strength. Such sheets are typically disposed.

A significant feature of the invention is the use of a splash fill assembly 27 to partially fill the plenum below film fill assembly 16. Splash fill assembly 27 may be of a conventional type such as generally horizontal slats 28 disposed on stringer wires 30 and spaced apart from each other at the same elevation and therebelow. This provides splash surfaces for water gravitating from the film fill to thereby spread the water out for more efficient cooling contact with the incoming air. Splash fill assembly 27 extends in the air inlet plenum below film fill assembly 16 and intersects the path between gas inlet opening 14 and the bottom surface of film fill assembly 16. Splash fill in the form of horizontal slats parallel to air flow are particularly advantageous in that they offer very low resistance to air flow.

As illustrated, splash fill assembly 27 includes an inner side 32 at least partially defining a central plenum chamber 34. Inner side 32 slopes from its top 32a which is adjacent to an outboard portion 16a of film fill assembly 16 and generally downwardly in an inward direction to terminate at the lowest and most inward portion 32b of the side just above collection basin 18. As used herein, the term "inner side" of the splash fill generally means the innermost extent of the splash fill assembly 27 adjacent to the generally open central chamber 34. As further defined herein, the "air inlet plenum" constitutes the entire area between collection basin 18 and film fill means 16. Thus, in FIG. 1 the air inlet plenum includes splash fill assembly 27 in a generally triangular configuration with its inner side 32 sloping inwardly and its outer side 34 in a generally vertical plane. It is apparent that side 32 is not a continuous wall but just the inward extent of the splash fill in splash fill assembly 27. It should be understood that there may be variations of side 32 from a straight line so long as in composite, it slopes in an inward direction. Thus, for example, it may be stepped to form an overall slope. Also, side 32 may be somewhat curved so long as there is a general inward slope from the top to the bottom of side 32.

In the illustrated embodiment, splash fill inner side 32 defines central plenum chamber 34. If desired for a particular application, a thin section of sloping film fill assembly 35, of the type described in Phelps U.S. Pat. No. 3,917,764 may be disposed between splash fill side 32 and chamber 34 so long as the adjacent chamber slopes in general conformance to the slope of side 32. Film fill assembly 35 is substantially thinner than film fill assembly 16, e.g., no greater than about 25% to 50% of its thickness. This is because it is more desirable to maximize the film fill thickness in the pure counterflow film fill 16 than in the sloping film fill 35 which functions as a combined film fill and splash fill means, as described in the last named Phelps patent.

One advantage of film fill assembly 35 is that by sloping to adjacent sloping side 32 and on substantially the same plane assists air flow balance while providing wetted surface that does not add to the pumping head of the tower. In other words, it does not add to the height (thickness) of film fill assembly 16 but still provides a positive cooling effect.

There may be some towers where the splash fill is rather widely spaced. Such wide spacing can result in some of the air migrating up through the splash fill rather than being mostly conveyed horizontally into plenum 34. If the air which short-circuits vertically combines with air which is entered into the upper portions of air inlet 14, an unbalanced air stream would be formed. This tends to create a modified condition as set forth in the background of this application. By installing film fill assembly 35 along the plane of side 32, formation of concentrated streams of air are minimized since such streams would develop disproportionately high pressure losses in passing through film fill assembly 35. By including this film fill assembly, the air tends to spread out substantially uniformly along the plane of side 32 because of the effect described above, namely, the splash fill assembly combined with the effect of the narrow film fill assembly 35. The benefit of using film fill assembly 35 is particularly noticeable when the splash fill is very widely spaced.

The precise slope to side 32 is defined by certain operating parameters of the system. Splash fill 27 serves the dual purposes of (a) providing adequate air flow to the central portion of the film fill by impeding air from turning upwardly too soon as it enters the tower, and (b) to improve air-water contact to improve cooling efficiency. With respect to (b), water gravitating through the film fill contacts the splash fill assembly before falling into the basin to further divide streams of the gravitating water falling through the film fill assemblies. As illustrated by arrows A, the air entering the film fill assembly towards the top of the tower inlet 14 is permitted to turn upwardly toward the film fill in the outboard region of the tower because the splash extends only a short distance inboard there.

Conversely, the air entering inlet 14 towards the bottom of the tower must travel a further inboard distance prior to turning upwardly. In the illustrated embodiment, the air between the lower, adjacent layers of the splash fill assembly travels nearly to the center of the air inlet plenum prior to having a free path upwardly. In this manner, the air distribution is relatively uniform travelling upwardly through the film fill assembly to further increase the efficiency of air-liquid contact in the film fill. In other words, the splash fill serves as a conveyor to move part of the air to the innermost portion of the counterflow film fill.

To accomplish the above functions the slope of side 32 of splash fill assembly 27, should be at a substantial angle to both the vertical and horizontal. A preferred slope is about 45° from the vertical while other slopes may be utilized, say, about 30°–60° from the vertical.

As illustrated, point 32a of side 32 is adjacent the outboard edge of the film fill assembly 16 while the lowermost point 32b of side 32 is adjacent the center line of the tower. However, it should be understood that the outboard edge 16a of film fill assembly 16 may be extended outside the uppermost extent of splash fill assembly 27. In some towers, positioning the splash fill inboard of edge 16a is advantageous in several ways. The splash fill is thereby removed from the point where very cold air enters the tower during winter months, thus protecting this splash fill from the problems associated with ice formation. The splash fill is thereby also moved inboard of the turbulent air conditions sometimes associated with air inlets. Such turbulent air can adversely affect fill performance and can also result in physical displacement of splash bars. In certain towers having high velocity air entering inlet 14, the air flow resistance of splash fill 32a will provide a barrier to help prevent air from bypassing outer portions of film fill 16a, even though said splash fill is inboard of edge 16a. Such a positioning of the splash fill inboard of edge 16a will normally provide this protection from air inlet conditions if there is a minimum of 20% of the film fill plan area outboard of the edge 32a of the splash fill. The same reasoning applies to the discussion of FIG. 2 below. Also, lowermost point 32b may be adjacent center line 12 or somewhat outboard thereof if desired. Furthermore, since the air turning upwardly along paths A requires a certain curvature to do so, there would be sufficient air travelling in paths somewhat above the lowermost portion of the splash fill to permit contact with the film fill at center line 12 even if the splash fill did not extend to the center line. Accordingly, the splash fill at the bottom of side 32 may merge with the splash fill to the left hand side (not shown) of the tower or may terminate outboard of the center line 12.

Referring to FIG. 2, a tower is illustrated similar to that of FIG. 1 with the only difference being that a portion of the outboard side of the splash fill assembly 27 is sloped. Thus, the aforementioned description and part members will apply with the exception that the right hand side of splash fill assembly 27 will be designated by number 40. The upper portion 40a of side 40 is illustrated as being generally in a vertical plane. However, the lower portion 40b of side 40 is sloped so as to more nearly equalize pressure drop through the splash fill and further balance air velocity entering the counterflow fill. The slope of portion 40b may vary within the parameters set forth above. Also, the ratio of the vertical wall portion to the sloped portion may vary to a considerable extent so long as there is sufficient vertical side portion 40a to permit a relatively short splash fill section at the top of the splash fill so that air may turn quickly upwardly for contact with the outboard side of the film fill.

The reason why the sloped bottom side 40b provides further equalization of the pressure drop and further balance of the air velocity is as follows. Splash fill resistance to air flow is due in large part to the effect of the splash bars and the splashing liquid from these bars. FIG. 2 thus presents a more uniform baffle or membrane for a balanced air flow into the tower than does FIG. 1. FIG. 1, on the other hand, creates more splashing overall than does FIG. 2, and FIG. 1 would thus be preferable for low velocity air entrance streams.

The portion to the left hand side of FIGS. 1 and 2 may constitute a mirror image of the right hand portion described above. Alternatively, it may include one of the variations set out above. In this instance, the central chamber has an inverted triangular configuration.

In another embodiment (not shown) the tower is in a circular configuration so that the outer wall is circular. In that instance, the splash fill may define a central chamber in the configuration of an inverted cone or the frustum thereof.

The embodiment of FIG. 3 includes, in addition to the foregoing, sloped film fill assemblies, and splash fill above and below the sloped film fill assembly. The advantage of a sloped film fill assembly in combination with splash fill assembly above and below it is described in Phelps U.S. Pat. No. 3,917,764. The description with respect to the sloping film fill and the adjacent splash fill is incorporated herein by reference.

Referring specifically to FIG. 3, generally horizontally disposed film fill assembly 50 is mounted in a central region of the tower. It may be of the type described above. Outboard of film fill assembly 50 are sloping film fill assemblies 52 and 54 mounted to the left and right of film fill assembly 50 and extending outboard thereof. The film fill assemblies extend generally downwardly to a region of the same general elevation as film fill assembly 50. A cooled liquid basin 56 is disposed below film fill assemblies 50, 52 and 54 in a position to receive liquid gravitating therefrom.

Liquid is supplied through a water inlet pipe 58 including nozzles 60 disposed above perforate distribution pans or trays 62 for directing water onto sloping film fill assemblies 52 and 54. Inlet pipe 58 also includes a downcomer pipe 64 with spaced nozzles 66 for directing water on to the top of the surface of film fill assembly 50.

As in the embodiments of FIGS. 1 and 2 the vertical stack 68 is secured to the top face of the tower and extends upwardly to define an upper outlet opening 70. Fan 72 is disposed within vertical stack 68 and is coupled to a source of power for actuation to cause currents of air to be drawn through the tower.

A conventional drift eliminator wall 74 is disposed across the path of air exiting from the cooling section of the tower in a generally upward and inward direction to prevent gravitating water from being carried as a spray out of the tower. Wall 74 includes a generally sloped portion 74a and a generally horizontal portion 74b which are interconnected. It may be of any conventional type such as series of spaced inclined baffles to permit the free flow of air therethrough but to prevent significant quantities of liquid droplets to pass upwardly out of the tower.

A cross-flow splash type fill 76, including horizontal slats 78, are disposed in the area of film fill assemblies 52 and 54, and below nozzle 60 to intersect the path of gravitating liquid and air passing upwardly from the film fill assembly. This optional splash fill assembly 76 provides increased cooling to the tower and permits more uniform distribution of liquid onto the upper surface of film fill assemblies 52 and 54.

Below film fill assemblies 52 and 54 is a large splash fill section 80 also of the cross-flow type. The upper region 80a of splash fill section 80 is directly below film fill assemblies 52 and 54 and form a generally triangular section. Below film fill assembly 50, splash fill 80 continues and extends in a sloping inward direction defining, with the lower surface of film fill assembly 50, a central generally open chamber 82. The entire tower is defined by an outer wall 84 including air inlet louvers 86 to direct the flow of air into the tower in a known manner.

Referring to film fill assemblies 52 and 54, the description of the film fill set forth in the aforementioned patent No. 3,917,764, apply herein. Thus, the inclination of the principal plane of film fill assemblies 52 and 54 may vary substantially as between 20° and 70° from the vertical depending upon the requirements of the particular tower to be employed. The film fill assemblies 50, 52 and 54 suitably are formed of sheets mounted sufficiently far apart for the passage of air and of water and to permit the liquid travelling through the film fill assembly to spread into thin uniform layers travelling through the film fill.

In operation, water from nozzle 60 is spread out in distribution pan 62 and passes downwardly onto splash fill assembly 76 where it is spread out for uniform contact with the upper surface of film fill assemblies 52 and 54. Then, the liquid passes through film fill assembly 54 along the vertically disposed sheets forming thin films on them. On exiting from film fill assemblies 52 and 54, the liquid contacts the adjacent portion of splash fill assembly 80 to further disrupt the water and improve air-water contact. The water is collected in water collection basin 56. Water also is directed through nozzle 66 onto generally horizontally disposed film fill assembly 50 wherein the water is spread onto sheets of the film fill and then passes downwardly contacting an adjacent portion of splash fill 80 and also is collected on water collection basin 56.

Referring to the air path in FIG. 3, air is directed to the lower side of film film assemblies 52 and 54 through the air inlet louvers and continues its paths along arrows B to turn upwardly into outlet opening 70. The air entering the lower portion of the tower travels generally horizontally through the splash fill until it reaches the central chamber 82 wherein the air turns upwardly to pass through the horizontal film fill assembly as described above.

The combination of the sloping film fill and the horizontal film fill in the above configuration provides the following advantages. The louvered opening the full height of the tower permits greater amounts of air to be circulated than if the air openings were restricted to that portion of the tower below film fill 50. The air and water obviously contact each other in counterflow in sections 52 and 54, which is preferable to crossflow cooling as shown in Phelps U.S. Pat. No. 3,707,277. The splash fill 80 adds some beneficial effect in low resistance crossflow cooling in addition to the film fill 50 counterflow cooling, a feature absent in Phelps U.S. Pat. No. 3,707,277.

What is claimed:

1. A cooling tower comprising:
   (a) at least one upright outer wall means having at least one gas inlet opening,
   (b) a gas outlet opening,
   (c) counterflow film fill means having upper and lower surfaces mounted in said tower to extend in a generally horizontal direction and intersecting a path between said gas inlet and gas outlet openings,
   (d) means for supplying a gravitating liquid to the counterflow film fill means upper surface, and
   (e) splash fill means mounted in said tower and extending below said counterflow film fill means in the cooling tower inlet plenum to intersect the path between said gas inlet and outlet openings, said splash fill means including at least one inner side sloping from its top adjacent to an outboard portion of said film fill means to extend generally downwardly in an inboard direction; said cooling tower defining a generally open central chamber with one sloping side generally conforming to the slope of said sloping splash fill means inner side.

2. The cooling tower of claim 1 in which said splash fill means sloping side defines said central chamber sloping side.

3. The cooling tower of claim 1 together with sloping film fill means in the same general plane as said splash fill means sloping side and closely adjacent thereto.

4. The cooling tower of claim 1 in which the plan area of the film fill means extends outwardly from the outboard edge of the splash fill means, said outward extension covering a plan area at least about 20% of the total of said film fill plan area.

5. The cooling tower of claim 1 in which said inner side slopes at an angle of at least 30° from the vertical.

6. The cooling tower of claim 1 in which said outer wall means comprises at least two outer walls facing each other and said splash fill means also defines a second inner side at least partially defining said central chamber and facing said one side, said splash fill means also sloping generally downwardly in an inboard direction.

7. The cooling tower of claim 1 in which said outer wall means comprises a circular wall and said chamber is in the configuration of an inverted cone or the frustum thereof.

8. The cooling tower of claim 1 together with at least one sloping film fill means sloping downwardly in an inboard direction and disposed outboard of and above said substantially horizontal film fill means to intersect a path between said inlet and outlet gas openings.

9. The cooling tower of claim 8 in which said sloping and substantially horizontal film fill means comprise adjacent sheets spaced apart sufficiently for the passage of gas and of liquid gravitating from said supply means.

10. The cooling tower of claim 8 in which said sloping and substantially horizontal film fill means terminate proximal to each other so that substantially all of the gas from said gas inlet opening passes through one or the other of said film fill means.

11. The cooling tower of claim 8 in which said splash fill means includes splash fill at the same elevation as said sloping film fill means.

12. The cooling tower of claim 11 in which at least a portion of said splash fill is inboard of said sloping film fill means.

13. The cooling tower of claim 11 in which at least a portion of said splash fill is outboard of said sloping film fill means.

14. The cooling tower of claim 1 in which said splash fill means defines an outboard side which slopes downwardly in an inward direction.

15. The cooling tower of claim 14 in which the plan area of the film fill means extends outwardly from the outboard edge of the splash fill means, said outward extension covering a plan area at least about 20% of the total of said film fill plan area.

16. The cooling tower of claim 14 in which said outer side includes a portion which slopes at an angle of at least 30° from the vertical.

* * * * *